United States Patent [19]

Woodward

[11] 4,028,708

[45] June 7, 1977

[54] ANTENNA FEED FOR DUAL BEAM CONICAL SCAN TRACKING RADAR

[75] Inventor: Elmer Donald Woodward, Los Altos, Calif.

[73] Assignee: The United States of America as represented by the Secretary of the Navy, Washington, D.C.

[22] Filed: Oct. 10, 1975

[21] Appl. No.: 622,283

[52] U.S. Cl. ............................. 343/777; 343/16 M; 343/854; 333/21 A

[51] Int. Cl.$^2$ ........................................ H01Q 3/10

[58] Field of Search ................ 343/16 M, 786, 854, 343/777; 333/21

[56] References Cited

UNITED STATES PATENTS

| | | | |
|---|---|---|---|
| 3,803,617 | 4/1974 | Ajioka et al. ...................... | 343/786 |
| 3,936,838 | 2/1976 | Foldes ................................ | 343/786 |

Primary Examiner—Eli Lieberman
Attorney, Agent, or Firm—R. S. Sciascia; G. J. Rubens; H. Fendelman

[57] ABSTRACT

An improved antenna feed providing control of the plane of polarization especially useful with "scanning with compensation" radar tracking. An input transducer is coupled to first and second output transducers whereby the output transducers transmit two pencil-beam radiation patterns which are squinted by equal but opposite angles with respect to the scan axis. During reception, however, a non-reciprocal coupling means provides for separate sensing of the return signals rceived by the first and second output means and converts the signal received by the second output means so that it is in quadrature relationship with the signal received by the first output means.

8 Claims, 6 Drawing Figures

ANTENNA FEED FOR DUAL BEAM CONICAL SCAN TRACKING RADAR

BACKGROUND OF THE INVENTION

"Scanning with compensation" is a method of radar tracking which, like the more familiar conical scanning tracking, generates a tracking error signal from the modulation of a target echo which results from rotating about the antenna scanning axis an antenna pattern which is offset in angle or squinted by an amount which is typically one half to one quarter of the half-power one way beam width of the antenna. Unlike conical-scan tracking, the antenna feed is used to generate two pencil-beam radiation patterns which are squinted by equal but opposite angles with respect to the scan axis. This type of radiation pattern is illustrated in FIG. 1. During transmission these two pencil-beam patterns are summed coherently to give a resultant approximately steady illumination field, i.e., for a considerable angular region centered on the scan axis, the field intensity will be nearly constant and unmodulated by the scanning rotation of the feed. During reception, however, the two pencil-beams are separately sensed, and each is scan-modulated in amplitude by an amount which depends on the angular distance of the target from the scan axis and with a phase which depends on the rotation of the feed around the scan axis. Because of the equal and opposite squint angles of the two beams, their modulation phases will necessarily be 180° out of phase with each other. The modulation on the two receiving beams is then processed to derive tracking error signals in two orthogonal planes in a manner generally similar to that used in conical scan tracking. However, it is recognized that tracking using the method of scanning with compensation is free from errors by target echo amplitude fluctuations (scintillation) which are present in conical-scan tracking and further that scanning with compensation tracking is highly resistant to a number of ECM techniques such as inverse-gain modulation which disrupts conical scan tracking.

A known method of producing the equal but opposite squinted beams for the method of scanning with compensation is to use two rectangular waveguides with a common wall (usually the broad wall, which results in a more desirable cross-over level than would the narrow wall). Alternatively, rectangular horns fed by rectangular waveguides may be used as the feed radiating elements, similarly joined along one side of their apertures. This feed assembly rotates for scanning the two beams, about an axis parallel to the direction of radiation and passing through the midpoint of their common wall. The two waveguides are connected to the non-rotating part of the antenna feed through a dual-channel rotary joint of any of a number of known types. The non-rotating inputs to the rotary joint are connected by microwave switches, hybrid bridges, and/or circulators so that the two apertures are connected in phase during transmission but disconnected from each other and separately connected to the receiver during reception. Because the rectangular waveguides have only a single fixed polarization, the plane of polarization of this feed will rotate at the same rate as the squinted beams rotate about the scan axis.

SUMMARY OF THE INVENTION

The present invention relates to an improved antenna feed for use with scanning-with-compensation radar tracking. The improvement offered by this feed is control of the plane of polarization of the transmitted and received radiation. Control of the plane of polarization offers many advantages: (a) Some types of antennas can only function with a fixed linear polarization; these includes Cassegrain type antennas which make use of polarization-twisting techniques to eliminate sub-reflector blockage, and some types of lens antennas. (b) When the antenna itself permits variations in the plane of polarization, it may be an advantage to use one or another polarization in particular circumstances. For example, circular polarization is well known to reduce rain clutter yet leads to a loss in signal strength when rain is absent; vertical polarization has a lower reflection coefficient from the sea surface than horizontal polarization; horizontal polarization enhances the reflectivity of targets with large horizontal surfaces such as airplane wings. (c) Control of the plane of polarization prevents its revealing scan rate information to ECM receivers, which is an ECCM advantage.

This control of the plane of polarization is effectuated by novel apparatus which makes use of circular waveguide orthogonal-mode transducers as polarization resolvers in a rotating scanning feed to control radiated polarization independently of feed motion while performing scanning-with-compensation radar tracking. Two output and one input circular waveguides are used with the orthogonal-mode transducers with the rectangular waveguide ports of the transducers connected respectively together through power dividers thus forming two offset, or squinted, feed apertures with the same polarization, which polarization is independently controlled with respect to feed scan rotation.

STATEMENT OF THE OBJECTS OF THE INVENTION

Accordingly, it is the primary object of the present invention to disclose a novel antenna feed particularly useful with scanning-with-compensation radar tracking.

It is another object of the present invention to disclose a novel antenna feed permitting control of the plane of polarization.

Other objects, advantages and novel features of the invention will become apparent from the following description of the invention when considered in conjunction with the accompanying drawings.

DESCRIPTION OF THE PREFERRED EMBODIMENT

Figure 1:
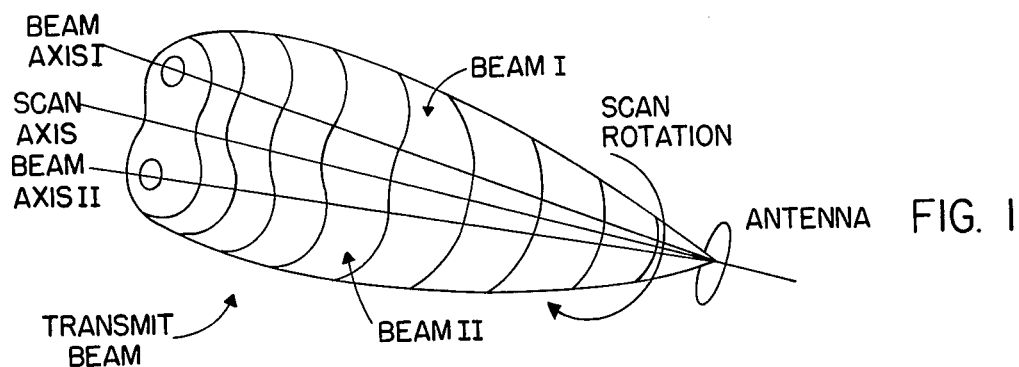
FIG. 1 is an illustration of the antenna radiation pattern used with scanning-with-compensation radar tracking.
Figure 2:
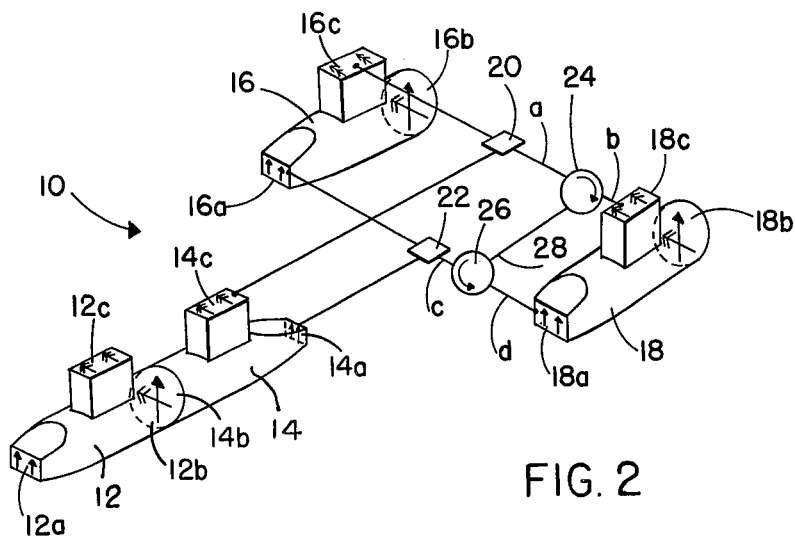
FIG. 2 is an illustration of the antenna feed according to the present invention, single barbed arrows being used for designating one of the two sets of orthogonal field vectors and double barbed arrows being used for the other.

The antenna feed 10 of the present invention is illustrated in FIG. 2. The antenna feed comprises four dual-mode rectangular-to-circular waveguide transducers 12, 14, 16 and 18. The input transducer of the present invention is comprised of transducers 12 and 14. Transducer 12 is comprised of rectangular guides 12a and 12c and circular waveguide 12b. Similarly, transducer 14 is comprised of rectangular guides 14a and 14c and circular guide 14b. Transducer 12 is a stationary transducer coaxial with waveguide 14b. Transducer 14 can be rotated physically about the common axis of circular waveguides 12b and 14b, this being the scanning rotation of the feed referred to previously. An RF choke would actually be provided at the junction between waveguides 12b and 14b to give electrical continuity without physical contact and prevent RF leakage. It has been omitted from the drawings, however, for the sake of clarity.

The two output transducers 16 and 18 are, likewise, comprised of rectangular waveguides 16a, 16c, 18a and 18c and circular waveguides 16b and 18b. The open ends of circular waveguides 16b and 18b are spaced an equal distance from, and on opposite sides of the axis of rotation previously mentioned and constitute the radiating apertures of the antenna feed. The rectangular waveguide 14c is connected to rectangular waveguides 16c and 18c through power divider 20. Similarly, the rectangular waveguide 14a is connected to rectangular waveguides 16a and 18a through power divider 22. The antenna feed is designed such that the electrical length between rectangular waveguide 14a and 16a is equal to the electrical length between rectangular waveguide 14a and 18a. Similarly, the electrical length between rectangular waveguide 14c and 16c is equal to the electrical length between rectangular waveguide 14c and rectangular waveguide 18c. Also, the electrical length between rectangular waveguides 14a and 18a is equal to the electrical length between rectangular waveguides 14c and 18c and also 14c and 16c. Although these connections are illustrated in the drawing simply as electrical transmission lines, ordinarily the connections would be rectangular waveguides, although this is not necessary to the successful functioning of the invention. The remaining elements of the antenna feed are circulators 24 and 26 interconnecting, respectively, power divider 20 and waveguide 18c and power divider 22 and waveguide 18a. Cross connection transmission line 28 interconnects circulators 24 and 26.

In order to understand the operation of the invention the properties of the dual-mode rectangular-to-circular waveguide transducers 12, 14, 16 and 18, each of which operates in the same manner, are described below. Considering, for example, transducer 16, a signal propagating in rectangular guide 16a in its fundamental $TE_{10}$ mode will result in a vertical polarized $TE_{11}$ mode signal in circular waveguide 16b. A $TE_{10}$ mode signal in rectangular waveguide 16c will excite a horizontally polarized $TE_{11}$ mode in circular waveguide 16b, provided the transducer is properly proportioned and matched in a known manner. Because of the orthogonality of these modes in waveguide 16b, they are completely uncoupled and there is, therefore, no coupling between guides 16a and 16c. By reciprocity, a vertically polarized $TE_{11}$ signal in waveguide 16b will couple only to waveguide 16a while a horizontally polarized signal will couple only to waveguide 16c. Since an arbitrarily polarized $TE_{11}$ signal in waveguide 16b can be resolved into components in any two orthogonal planes, waveguide transducer 16, as well as transducers 12, 14 and 18 will act as resolvers for such a signal with the signals in waveguides 16a and 16c being proportional, respectively, to the vertical and horizontal vector components of the signal in waveguide 16b.

Continuing further, by symmetry and reciprocity, it is clear that a $TE_{11}$ signal of any arbitrary polarization in circular guides 12b and 14b will be resolved in transducer 14 into its vertical and horizontal polarization components. The vertical polarization component will be propagated through rectangular waveguide 14a and the horizontal polarization component will be propagated through rectangular waveguide 14c. After propagating through the coupling network including the transmission lines and power dividers 20 and 22, one half of the signal will enter transducer 16 and the other half will enter transducer 18, the horizontal components entering through waveguides 16c and 18c and the vertical components entering through waveguides 16a and 18a. In transducer 16, the horizontal and vertical components will be recombined so that a $TE_{11}$ signal identically polarized to the $TE_{11}$ signal in circular waveguides 12b and 14b previously described will be propagated in circular waveguide 16b. Similarly, an identically polarized $TE_{11}$ signal will be propagated in circular waveguide 18b. If the plane of polarization of the signal into waveguide 14b is rotated, the polarization in waveguides 16b and 18b will rotate equally. Likewise, if the polarization into waveguide 14b is fixed, but the entire assembly of transducers 14, 16 and 18 rotates about the axis of waveguide 14, the plane of polarization in waveguide 16b and 18b will remain fixed.

The input transducer comprised of waveguides 12 and 14 has power dividers 20 and 22 connected to waveguides 14c and 14a and, respectively, to waveguides 16c and 16b and 18c and 18b of the two identical output transducers 16 and 18. By providing identical power dividers 20 and 22 and equal phase lengths in all of the connecting transmission lines, the signals in waveguides 16b and 18b will be of the same polarization as that in waveguides 12b and 14b. In particular, if waveguides 16b and 18b have their axes parallel to and equally spaced on either side of the axis of waveguide 14 and the whole assembly is rotated about the latter axis, the two apertures of 16b and 18b will radiate appropriate signals for forming the two squinted beams differing by 180° in scan phase as required for scanning with compensation, while maintaining during scan whatever polarization of signal is input to guide 14b.

Separation of the received signals from the two guides 16b and 18b is provided for by the inclusion of a non-reciprocal connection comprised of the two three-port circulators 24 and 26 and the cross connection transmission line 28. This non-reciprocal connection connects one only of the two output transducers to the input transducer. The effect of these non-reciprocal elements is to cross the connections between the output transducer 18 and the input transducer 14 and thus rotate the two orthogonal components of the received signal at the inputs to the transducer 14 by 90° in opposite directions. A signal from guide 18c propagates along transmission line b, through circulator 24 (clockwise), through transmission line 28, circulator 26

(counterclockwise), transmission segment c and finally to guide 14a. Similarly, a signal from 18a propagates through d, 26, 28, 24, a, 20 and arrives at 14c. One of these two orthogonal components is further reversed in phase, i.e., rotated by 180°, such that the components add to produce a signal in the circular waveguide 14b which is in quadrature to that from the transducer 16. This 180° phase shift is introduced by positioning the two circulators asymmetrically in the two transmission lines so that, for example, line segment a is electrically one quarter wavelength longer than line segment c and segment d is one quarter wavelength longer than segment b.

Figure 3A:
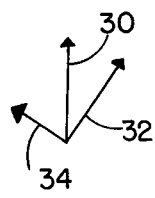
FIGS 3a, 3b and 3c are vector illustrations of the orthogonal components of the received signals described for convenience of distinction as horizontal and vertical as processed by the antenna feed of the present invention.
Figure 3B:
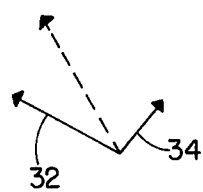
Figure 3C:
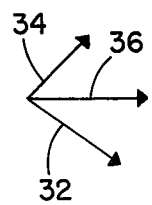

If the transmitter is connected to one of the rectangular guides on the fixed transducer 12, e.g., to quide 12a, the field in guides 16b and 18b will be equal in amplitude and phase and will remain, in this case, vertically polarized as the scanning portion of the feed rotates. When receiving, however, the vertically polarized signal received in waveguide 16b will appear in quide 12a while that received in guide 18b will appear in guide 12c. The resulting 90° vector rotation is demonstrated by the vector diagram of FIGS. 3a, 3b and 3c. In FIG. 3a the received signal is represented by vector 30 and the orthogonal (vertical and horizontal) components thereof are represented by vectors 32 and 34, respectively. In FIG. 3b the change effectuated by the circulators 24 and 26 is illustrated. The vertical component 32 has been shifted counter clockwise by 90° and the horizontal component 34 has been shifted clockwise by 90°. This illustrates the feature of the invention whereby the output of waveguide 18c is crossed by circulators 24 and 26 into waveguide 14a and the output of waveguide 18a is, likewise, crossed into waveguide 14c. Finally, the 180° phase shift introduced by the difference in lengths of the transmission lines a, b, c and d is illustrated in FIG. 3c. Therein it is seen that component 32 is phase shifted by 180° such that the resultant vector 36 is in quadrature with the vector 30. Since the signal received by waveguide 16b is presumed to be identically polarized to that received by waveguide 18b, vector 30 is illustrative of the signal transmitted to transducer 16 from the transducer 18, the two signals being in quadrature relationship. These two signals can then be subsequently processed as is well known in scanning-with-compensation techniques.

Additionally, by controlling the relative amplitude and phase of transmitted excitation of waveguides 12a and 12c, it is possible to transmit and receive linear polarization of any orientation or elliptical polarization of either hand and any axial ratio, including circular.

As an alternative to the illustrated and preferred embodiment, turnstile junctions may be utilized in place of the rectangular-to-circular-waveguides illustrated in FIG. 2. A turnstile junction consists of four rectangular guides in an H-plane cross with a circular guide at and perpendicular to their juncture. A linearly polarized $TE_{11}$ wave of any orientation angle in the circular guide will excite the four rectangular guides in a definite way which depends on the polarization plane. Thus, one input turnstile junction could be used with two output turnstile junctions, with circulators and differing length transmission lines as in the previously described embodiment. Obviously, four connecting transmission lines would be required so that the wave in the output circular guide would be polarized the same as that in the input guide.

The non-reciprocal transmission device utilized in the embodiment and illustrated in FIG. 2 may be implemented in a variety of alternative configurations. For example, a balanced TR-tube duplexer or a balanced ATR-duplexer could be used.

Figure 4:
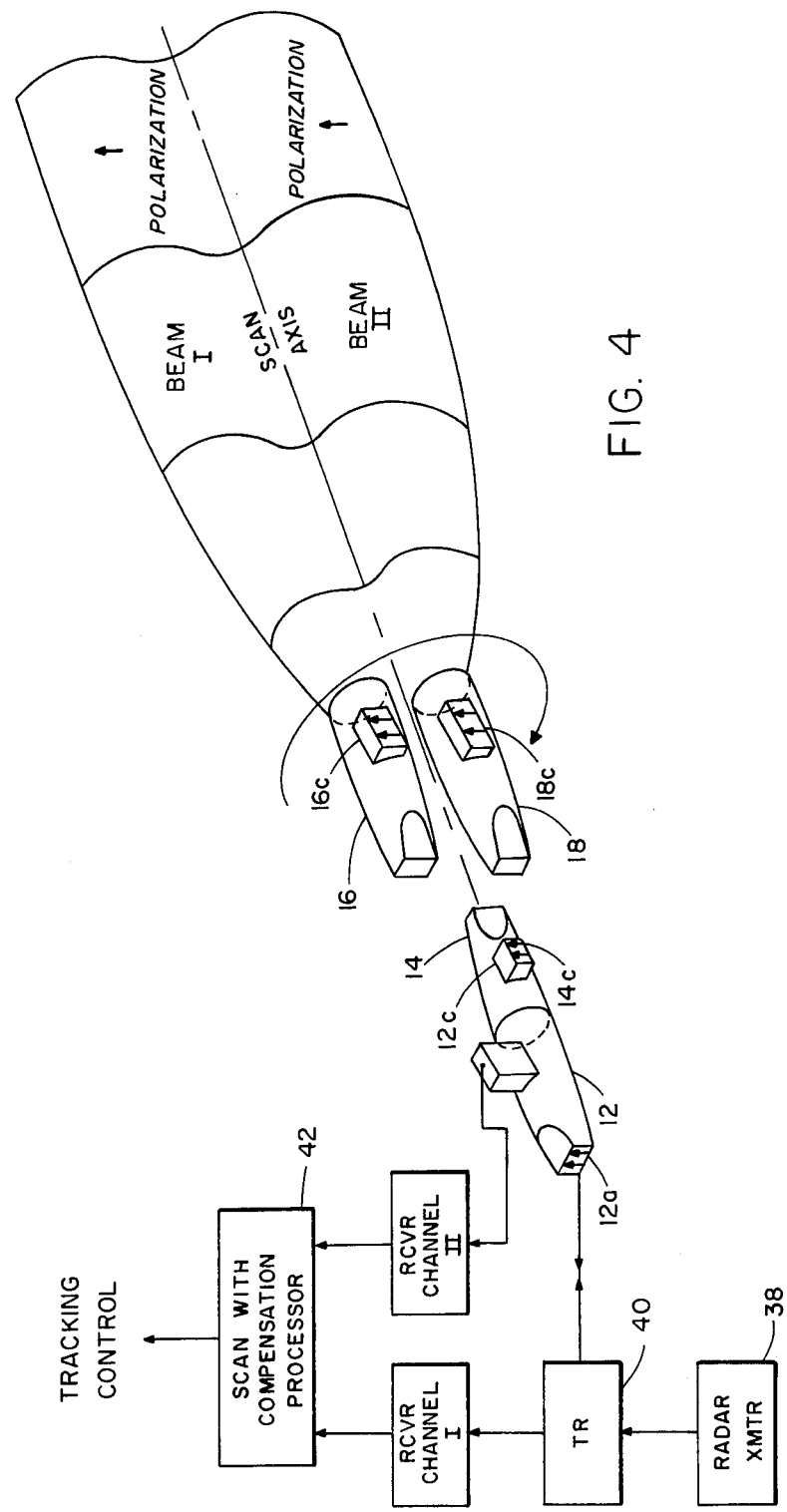
FIG. 4 is a schematic diagram of the antenna and feed according to the present invention as coupled to an exemplary tracking radar which operates on the principle of scan-with-compensation.

Referring now to FIG. 4, the present invention is illustrated in an exemplary tracking radar environment. The coupling means between transducer 14 and radiating transducers 16 and 18 have been omitted for clarity. Radar transmitter 38 is used to excite the input transducer 12 through a TR device 40 with a signal in the $TE_{10}$ fundamental mode into port 12a. This causes radiation plane polarized. Similarly, polarized received beams I and II give rise to separated received beam signals in ports 12a and 12c, respectively. These separate receive beam signals are amplified and reduced to video signals in Receiver Channels I and II, respectively, and then form the inputs to the scan-with-compensation processor 42. Transducer 12 is stationary and the remainder of the feed rotates as shown by the large curved arrow in FIG. 4 which results in different amplitude and/or phase modulations being applied to the two separated received signals. This difference of modulation is utilized by the scan-with-compensation processor to form the tracking control signal in a known manner. The tracking control signal is then used to keep the direction of the scan axis pointed approximately at the moving target from which the echo signals received by Beams I and II were reflected.

Obviously, many other modifications and variations of the invention are possible in view of the above teachings. It is therefore to be understood that within the scope of the appended claims the invention may be practiced otherwise than as specifically described.

What is claimed is:

1. An antenna feed for a dual beam conical scanning radar comprising:
   input means for resolving an input signal into its vertical and horizontal polarization components;
   first and second means for outputting first and second output signals that are identically polarized to each other and to said input signal and for receiving return signals;
   coupling means for coupling said input means to said first and second means and for separating a return signal received by said first and second means into a first component and a second component in quadrature with said first component, said coupling means comprising a non-reciprocal cross connection between said first and second means, whereby said antenna feed provides for control of the plane of polarization of the transmitted and received signals.

2. The antenna feed of claim 1 wherein said first and said second means are dual-mode rectangular-to-circular waveguide transducers.

3. The antenna feed of claim 2 wherein said input means comprises a first dual-mode rectangular-to-circular waveguide transducer coupled to a second dual-mode rectangular-to-circular waveguide transducer.

4. The antenna feed for claim 3 wherein said coupling means includes first and second power dividers connected between said second dual-mode rectangular-to-circular waveguide transducer and said first and second means, respectively.

5. The antenna feed of claim 4 wherein said coupling means further includes first and second three-port circulators connected between said first and second power dividers and said first means.

6. The antenna feed of claim 5 wherein said coupling means further includes first (a) and second (c) transmission means coupling, respectively, said first and second power dividers to said first and second circulators, said first transmission means being one-forth wavelength longer than said second transmission means; and third (b) and fourth (d) transmission means coupling, respectively, said first and second circulators to said first means, said fourth transmission means being one-fourth wavelength longer than said third transmission means.

7. The antenna feed of claim 6 wherein one port of said first three-port circulator is connected to one port of said second three-port circulator.

8. An antenna feed for a dual beam conical scanning radar comprising:

input means for receiving the vector components of an input signal and for synthesizing the resultant of such components into a signal of controlled polarization and resolving said signal into orthogonal vector components in a frame of coordinates rotating with respect to said input means;

first and second means for outputting as radiated beams first and second output signals that are identically polarized to each other and to said input signal and for receiving return signals, said first and second means being symmetrically disposed about the axis of rotation of said rotating frame of coordinates and adapted for rotating therewith in such manner as to conically scan said radiated beams; and coupling means for coupling said input means to said first and second means and for separating a return signal received by said first and second means into, respectively, a first component and a second component in quadrature with said first component, said coupling means comprising a non-reciprocal cross connection between said first and second means.

* * * * *